US010566902B1

(12) United States Patent
Romeo

(10) Patent No.: US 10,566,902 B1
(45) Date of Patent: Feb. 18, 2020

(54) METHODS AND SYSTEMS OF OPERATING BUCK-BOOST CONVERTERS

(71) Applicant: SEMICONDUCTOR COMPONENTS INDUSTRIES, LLC, Phoenix, AZ (US)

(72) Inventor: Dominique Romeo, Montauban (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/109,016

(22) Filed: Aug. 22, 2018

(51) Int. Cl.
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC .................................................. H02M 3/1582
See application file for complete search history.

(56) References Cited

U.S. PATENT DOCUMENTS

| 7,394,231 | B2 | 7/2008 | Flatness et al. | |
|---|---|---|---|---|
| 7,768,245 | B1* | 8/2010 | De Cremoux | H02M 3/156 323/225 |
| 8,106,639 | B1* | 1/2012 | Ju | H02M 3/1582 323/282 |
| 2007/0273340 | A1* | 11/2007 | Miller | H02M 3/1582 323/224 |
| 2011/0037446 | A1* | 2/2011 | Engelhardt | H02M 3/1582 323/282 |
| 2011/0227550 | A1* | 9/2011 | Walters | H02M 3/1582 323/283 |
| 2011/0279098 | A1 | 11/2011 | Ren et al. | |

(Continued)

FOREIGN PATENT DOCUMENTS

EP 2953248 A1 12/2015

OTHER PUBLICATIONS

Kim, Jong-Seok et al.; "High-Efficiency Peak-Current-Control Non-inverting Buck-Boost Converter Using Mode Selection for Single Ni-MH Cell Battery Operation," Copyright 2015 IEEE; 4 pages.

(Continued)

*Primary Examiner* — Fred E Finch, III
(74) *Attorney, Agent, or Firm* — Dickinson Wright PLLC; Mark E. Scott

(57) ABSTRACT

Operating buck-boost converters. At least some of the example embodiments are methods including: producing an output voltage and an output current from the buck-boost converter; sensing a feedback parameter by a sensor disposed between an inductor of the buck-boost converter and a load; generating an error signal based on the feedback parameter; running the buck-boost converter in a buck-only mode, the buck-only mode operating at a switching frequency and during periods of time when the error signal is within a first range of values; and changing to a buck-boost mode when the error signal is in a second range of values, the buck-boost mode operating at the switching frequency; and transitioning to a boost-only mode when the error signal is in a third range of values, the boost-only mode operating at the switching frequency.

20 Claims, 6 Drawing Sheets

(56) References Cited

U.S. PATENT DOCUMENTS

| | | | |
|---|---|---|---|
| 2012/0146594 A1* | 6/2012 | Kobayashi | H02M 3/1582 323/234 |
| 2013/0328534 A1* | 12/2013 | Hsieh | G05F 3/02 323/271 |
| 2014/0084883 A1* | 3/2014 | Tanabe | H02M 3/1582 323/271 |
| 2014/0152272 A1* | 6/2014 | Bazzani | H02M 3/1582 323/234 |
| 2014/0266085 A1* | 9/2014 | Unno | H02M 3/04 323/234 |
| 2015/0357914 A1* | 12/2015 | Ozanoglu | H02M 3/158 323/271 |
| 2017/0040898 A1* | 2/2017 | Hong | H02M 3/1582 |
| 2017/0155324 A1* | 6/2017 | Choquet | H02M 3/1582 |
| 2017/0201178 A1* | 7/2017 | Cheng | H02M 3/1582 |
| 2018/0254704 A1* | 9/2018 | Unno | H02M 3/1582 |

OTHER PUBLICATIONS

Mullett, Charles E.; "Bimodal DC-DC Converter With an Efficient Pass-Through Zone," Published in Applied Power Electronics Conference, 2005; 4 pages.

* cited by examiner

METHODS AND SYSTEMS OF OPERATING BUCK-BOOST CONVERTERS

CROSS-REFERENCE TO RELATED APPLICATIONS

Not Applicable.

BACKGROUND

Power converters convert electrical energy at a first voltage to a second voltage. Buck converters receive an input voltage and create an output voltage that is lower than the input voltage. Boost converters, by contrast, receive an input voltage and create an output voltage that is higher than the input voltage. In some situations, input voltage may swing initially from being higher than the output voltage to being lower than the output voltage. For example, in automotive situations battery voltage may nominally be 12 Volts (V). During cranking of the engine, battery voltage may drop to about 4V, and after the engine is running and the alternator is charging battery voltage may be about 14V. Thus, circuits attempting to hold a constant voltage (e.g., 12V) for downstream devices, such as lighting circuits, may need to operate in buck mode at some points in time, and operate in boost mode at others points in time. Thus, a buck-boost converter may be used.

BRIEF DESCRIPTION OF THE DRAWINGS

For a detailed description of example embodiments, reference will now be made to the accompanying drawings in which.

DEFINITIONS

Figure 1:
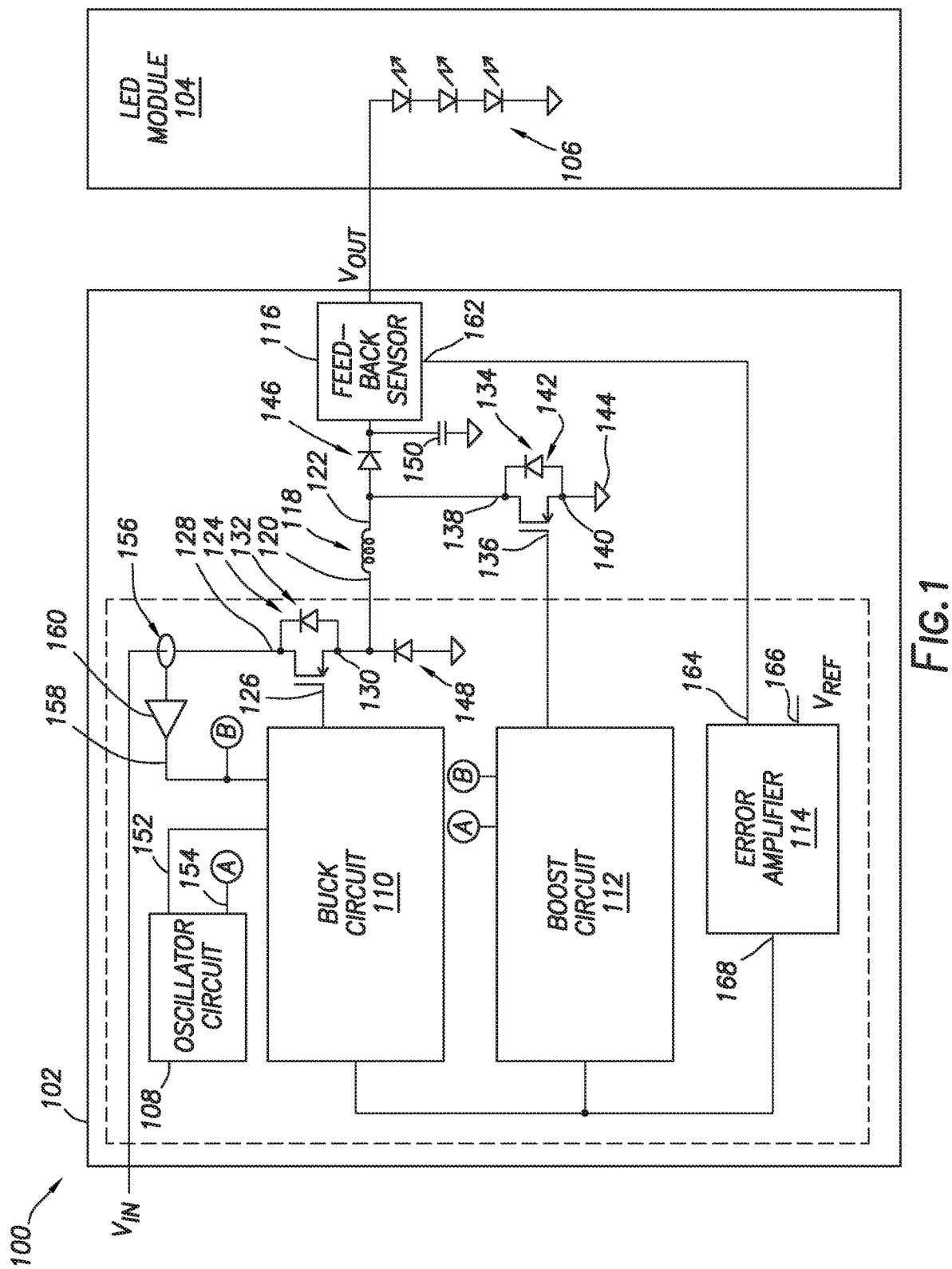
FIG. 1 shows an electrical block diagram of a system in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Buck-only mode" of a buck-boost converter shall mean an operating mode wherein a buck switch opens and closes within each switching period, and a boost switch remains open (i.e., non-conductive) throughout each switching period.

"Buck-boost mode" of a buck-boost converter shall mean an operating mode wherein both a buck switch and a boost switch open and close within each switching period.

"Boost-only mode" of a buck-boost converter shall mean an operating mode wherein a buck switch is closed (i.e., conductive) throughout each switching period, and a boost switch opens and closes during each switching period.

"Controller" shall mean individual circuit components, an application specific integrated circuit (ASIC), a microcontroller (with controlling software), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems of operating buck-boost converters. In particular, example embodiments are directed to buck-boost converters that operate at a single frequency and with peak current control across all the modes of operation (e.g., buck-only mode, buck-boost mode, and boost-only mode). Moreover, example embodiments are directed to buck-boost converters that have seamless transitions between the modes, and that utilize pass-through modulation in the buck-boost modes. The specification first turns to an example buck-boost converter implementation to orient the reader.

FIG. 1 shows an electrical block diagram of a system in accordance with at least some embodiments. In particular, the system 100 comprises a buck-boost converter 102 coupled to an example load in the form of light emitting diode (LED) module 104. Thus, the example system could be a circuit for driving LEDs in automotive applications; however, the example automotive application of driving an LED module shall not be read as a limitation of the invention. The methods and systems of operating the buck-boost converter 102 may find use in any operational circumstance driving multiple types of loads. The example LED module 104 comprises a plurality of LEDs 106 with three LEDs shown, but any non-zero number of LEDs may be implemented, The LED module 104 may be, for example, a headlight for an automobile, a running light for an automobile, or a blinker, to name a few.

The example buck-boost converter 102 couples to an input voltage VIN, and produces a voltage output $V_{OUT}$, with the $V_{OUT}$ in this case coupled to the example LED module 104. Internally, the buck-boost converter 102 comprises an oscillator circuit 108, a buck circuit 110, a boost circuit 112, an error amplifier 114, and a feedback sensor 116. The oscillator circuit 108, buck circuit 110, boost circuit 112, error amplifier 114, and feedback sensor 116 are used to control the gates of various electrically controlled switches. In particular, the buck-boost converter 102 comprises an inductor 118 that comprises a first lead 120 and a second lead 122. The first lead 120 couples to a buck switch illustratively shown as a field effect transistor (FET) 124 (hereafter buck FET 124). The buck FET 124 defines a gate 126, a drain 128, a source 130, and a body diode 132 between the drain 128 and source 130. The gate 126 is coupled to the buck circuit 110. The drain 128 couples to the input voltage VIN, and the source 130 couples to the first lead 120 of the inductor 118. The second lead 122 of the inductor couples to a boost switch illustratively shown as a FET 134 (hereafter boost FET 134). The boost FET 134 defines a gate 136, a drain 138, a source 140, and a body diode 142 between the drain 138 and source 140. The gate 136 is coupled to the boost circuit 112. The drain 138 couples to the second lead 122 of the inductor 118, and the source 140 couples to ground 144.

Still referring to FIG. 1, the second lead 122 of the inductor 118 in the example system also couples to an anode of a diode 146. The cathode of the diode 146 couples to the feedback sensor 116 and then the output voltage $V_{OUT}$. An output capacitor 150 couples between the cathode of the diode 146 and ground. Diode 146 prevents reverse current flow into the buck-boost converter 102 from the output capacitor 150 as well as downstream devices. In some cases, to reduce the power loss associated with forward voltage drop of diode 146, the diode 146 may be replaced with a FET that is made conductive during periods of time when the inductor 118 is delivering current to the output capacitor 150. The example circuit also comprises a second diode 148. The first lead 120 of the inductor 118 in the example system couples to a cathode of the diode 148, and the anode of diode 148 couples to ground. In some modes of operation the diode 148 may conduct current after the buck FET 124 is made non-conductive (e.g., act as a free-wheeling diode). In some cases, to reduce the power loss associated with forward voltage drop of diode 148, the diode 148 may be replaced with a FET that is made conductive during periods of time when the buck FET 124 is non-conductive.

The oscillator circuit 108 is configured to generate two clock signals: a buck clock signal on the buck clock output 152, and a boost clock signal on the boost clock output 154. In accordance with example embodiments, both the buck clock signal and the boost clock signal have the same frequency, but have a different phase. In one example, the boost clock signal has the same frequency as the buck clock signal, but the boost clock signal is phase delayed by 180° degrees, though other phase relationships are possible. The frequency of the buck clock signal and the boost clock signal define a switching frequency of the buck circuit 110 and the boost circuit 112, and thus the buck circuit 110 and boost circuit 112 operate at the same switching frequency across all modes of operation.

In accordance with example embodiments, the buck-boost converter 102 operates using peak current control in all three modes of operation (e.g., boost-only mode, buck-boost mode, and buck-only mode). That is, in example embodiments the buck circuit 110 and the boost circuit 112 control peak current through inductor 118, and the peak current control is implemented based on a current sense signal created by a current sensor. In some example embodiments the current sensor is a current sense transformer 156 comprising a conductive trace or lead coupled to the input voltage VIN, acting as a single-turn primary, and one more secondary windings around the single-turn primary. A lead of the secondary winding of the example current sense transformer 156 couples to an amplifier 160, and the amplifier defines a current sense output 158. Thus, the amplifier 160 produces a current sense signal on the current sense output 158, the current sense signal proportional to current flow on the single-turn primary. Other current sensors are possible. For example, a small value resistor may be coupled in series with the current flow from the input voltage VIN, the small value resistor thus producing a voltage proportional to current flow. In other cases, the buck FET 124 may be a SENSEFET™ brand device available from ON Semiconductor of Phoenix, Ariz., that is capable of producing an additional output signal that may be proportional to current flow through the main portion of the FET (and thus through the inductor 118 and feedback sensor 116).

Still referring to FIG. 1, the example buck-boost converter 102 comprises feedback sensor 116. The example feedback sensor 116 defines a feedback output 162, and the feedback sensor 116 is coupled between the cathode of diode 146 and the voltage output $V_{OUT}$. The feedback sensor 116 is configured to sense a voltage or a current supplied by the buck-boost converter to a load, such as the LED module 104. In the example case of a load in the form of LED module 104, once the LEDs 106 are conducting the output voltage $V_{OUT}$ changes very little in spite of changes in current flow through the LEDs 106. Thus, in some example systems the feedback sensor 116 is a current sensor, such as a current sense transformer or small resistor in series with the current flow. In other cases, such as non-LEDs loads, the feedback sensor 116 may be a voltage sensor sensing the output voltage $V_{OUT}$. The feedback signal produced by the feedback sensor 116 on the feedback output 162 is coupled to the error amplifier 114.

Error amplifier 114 defines a feedback sense input 164, a reference input 166, and an error output 168. The feedback sense input 164 is coupled to the feedback output 162 of the feedback sensor 116, and the error amplifier 114 configured to sense the feedback signal on the feedback sense input 164 and produce an error signal on the error output 168. The error signal is proportional to the feedback signal. More particularly, the error signal produced on the error output 168 is proportional to a difference in voltage between the reference voltage $V_{REF}$ applied to the reference input 166 and a gain of the error amplifier. The error signal produced on the error output 168 is provided to both the boost circuit 112 and the buck circuit 110.

Buck circuit 110 receives as input the error signal on the error output 168, the buck clock signal produced on the buck clock output 152 by the oscillator circuit 108, and a current sense signal produced on the current sense output 158 by the current sense transformer 156. The buck circuit is configured to assert gate 126 of the buck FET 124 based on assertion of the buck clock signal, and then de-assert the gate 126 of the buck FET 124 if the current sense signal reaches a peak current value. Similarly, the boost circuit 112 receives as input the error signal on the error output 168, the boost clock signal produced on the boost clock output 154 (as shown by the bubble "A"), and the current sense signal produced on the current sense output 158 (as shown by the bubble "B"). The boost circuit 112 is configured to assert the gate 136 of the boost FET 134 based on assertion of the buck clock signal if the error signal is in a first range of values, and then de-assert the gate 136 of the boost FET 134 when the current sense signal reaches a peak current value. The specification now turns to a more detailed description of the various modes of operation, starting with a buck-only mode.

Figure 2:
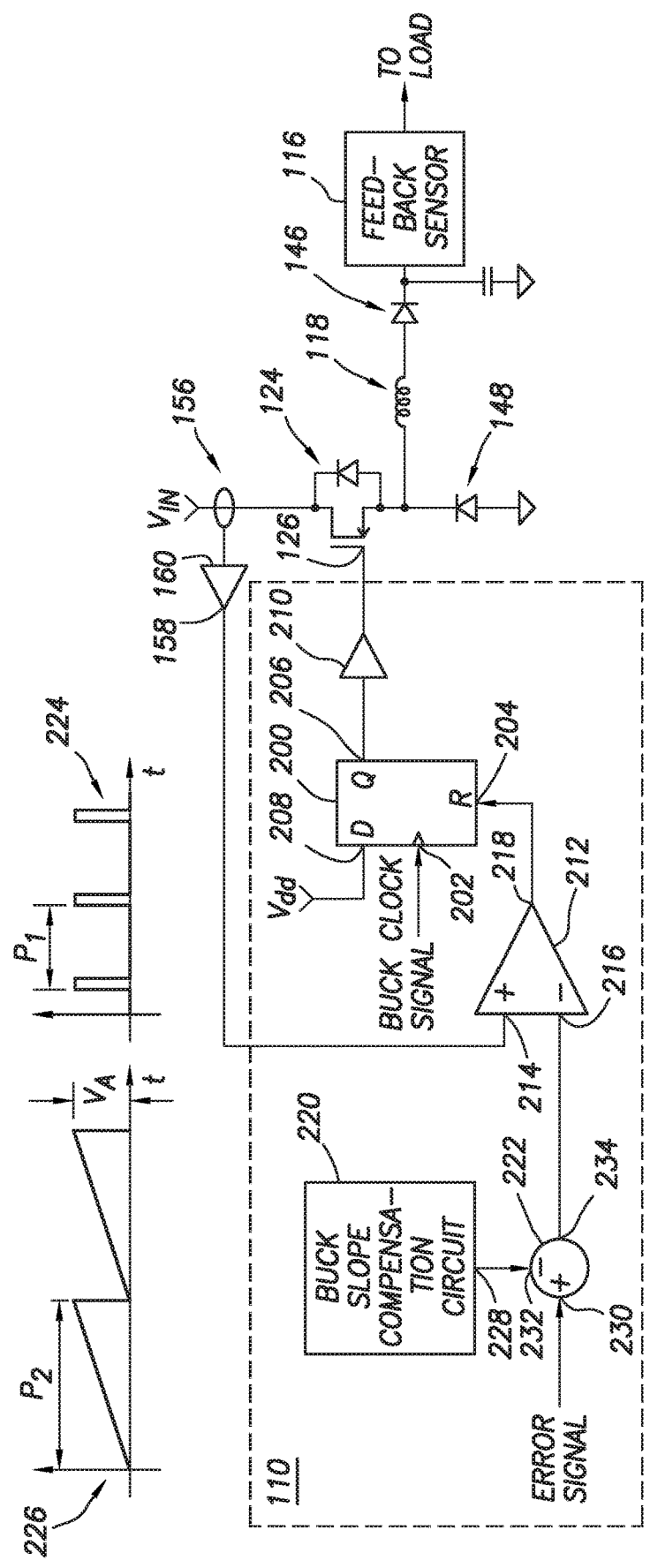
FIG. 2 shows a circuit diagram with respect to buck-only mode in accordance with at least some embodiments.

FIG. 2 shows a circuit diagram with respect to buck-only mode in accordance with at least some embodiments. In particular, FIG. 2 shows the buck circuit 110 coupled to the various electrical devices that create the output voltage $V_{OUT}$ (e.g., buck FET 124, inductor 118, diode 146, and diode 148). The example buck circuit 110 comprises a buck latch illustratively shown as a D flip-flop 200. The D flip-flop 200 defines a clock input 202, a reset input 204, and a latch or Q output 206, and a D input 208. The clock input 202 is coupled to the buck clock signal on the buck clock output 152 (FIG. 1). The D input 208 is coupled to a logic high signal (e.g., Vdd). The Q output 206 is coupled to the gate 126 of the buck FET 124 by way of a gate driver circuit 210. As will be discussed more below, the D flip-flop 200 acts as a latch circuit, but other types of latch circuits (e.g., set-reset flip-flop) may be used.

The example buck circuit 110 further includes a buck comparator 212 (e.g., an operational amplifier) defining a first input 214, a second input 216, and a compare output 218. The first input 214 is coupled to the current sense output 158 of the amplifer 160 coupled to the current sense transformer 156, the second input 216 is coupled to the error signal on the error output 168 (FIG. 1), and the compare output 218 is coupled to the reset input 204 of the D flip-flop 200. The description ignores for now the buck slope compensation circuit 220 and the summing circuit 222.

FIG. 2 further includes an embedded timing diagram 224 showing an example buck clock signal. In particular, the example buck clock signal comprises a series of pulses. The time between corresponding features of contiguous pulses (e.g., rising edges) defines a switching cycle or switching period P1, and the mathematical inverse of the switching period is the switching frequency. Assume initially that the Q output 206 is de-asserted, and that a pulse of the buck clock signal arrives at the clock input 202. By operation of the D flip-flop 200 the Q output 206 becomes asserted upon assertion of the clock input 202. Thus, the gate 126 of the buck FET 124 is asserted and the buck FET 124 becomes conductive. Current begins to flow from the input voltage VIN, through buck FET 124, through the inductor 118, and to the load, and the current is measured by the current sense transformer 156. Example embodiments implement peak current control, and thus the buck FET 124 is made nonconductive when the peak current through the inductor 118 (or equivalently, through the buck FET 124) is reached. In particular, the error signal applied to the second input 216 of the comparator 212 represents a peak current value. When the current signal applied to the first input 214 of the comparator 212 (from the current sense transformer 156 and amplifier 160) meets or exceeds the error signal on the second input 216, the comparator output 218 is asserted to the reset input 204 of the D flip-flop 200. When the reset input 204 is asserted, the Q output 206 is de-asserted, and thus the buck FET 124 is made nonconductive.

Because current through inductor 118 cannot change instantaneously after the buck FET 124 is made nonconductive, current continues to flow through the inductor 118 through the diode 148. In the example case of FIG. 2, if the average current supplied to the load, as measured by the feedback sensor 116, falls below a set point set by $V_{REF}$ (FIG. 1), the magnitude of the error signal applied to the comparator is increased, and thus the peak current in the next cycle is increased. Oppositely, if the average current supplied to the load is above the set point, the magnitude of error signal applied to the comparator is decreased, and thus the peak current in the next cycle is decreased.

When operating a buck converter in peak current mode, certain duty cycles tend to induce subharmonic oscillations in the electrical components. For example, the inductor 118 may resonate with the parasitic capacitances of the buck FET 124 and other FETS not shown, such as the boost FET 134 (FIG. 1). In order to reduce or eliminate the subharmonic oscillations, the example buck circuit 110 implements buck slope compensation circuit 220 and summing circuit 222. In particular, the buck slope compensation circuit 220 produces a time varying signal used to vary or dither the error signal applied to the buck comparator 212 such that peak current may be different as between contiguous switching cycles (regardless of change in the error signal). FIG. 2 further includes another embedded timing diagram 226 showing an example slope compensation signal. In particular, the example slope compensation signal comprises a series of saw-tooth pulses. The time between corresponding features of contiguous saw-tooth pulses (e.g., falling edges) defines a switching period P2, and the mathematical inverse of the switching period is the switching frequency. In some example embodiments the switching period P2 is twice as long as the switching period P1 of the buck clock signal, but the switching period P2 may be two or more multiples of P1. The example slope compensation signal also defines a peak magnitude VA whose value may be used to create an offset voltage that controls transitioning between modes of operation (discussed more below).

The buck slope compensation circuit 220 defines a slope output 228. The summing circuit 222 defines a first input 230, a second input 232, and a sum output 234. The first input 230 couples to the error signal on the error output 168 (FIG. 1), the second input 232 couples to the slope compensation signal on the slope output 228, and the sum output 234 couples to the second input 216 of the buck comparator 212. The example summing circuit 222 is configured to subtract the instantaneous value of the slope compensation signal from the error signal (the subtraction indicated by the negative sign associated with the second input 232), and produce a modified error signal on the sum output 234. Thus, the peak current in any one cycle is modified to reduce or eliminate the subharmonic oscillations.

In some example situations, the buck-boost converter 102 may operate in a buck-only mode. That is, when the input voltage VIN is sufficiently high, the buck-boost converter 102 may operate in a mode where the buck FET opens and closes within each switching period, and the boost FET (not shown in FIG. 2) remains open or nonconductive throughout each switching period. Thus, FIG. 2 with the boost FET not shown can be considered to show a buck-only mode of operation. The specification now turns to a more detailed description of the boost-only mode.

Figure 3:
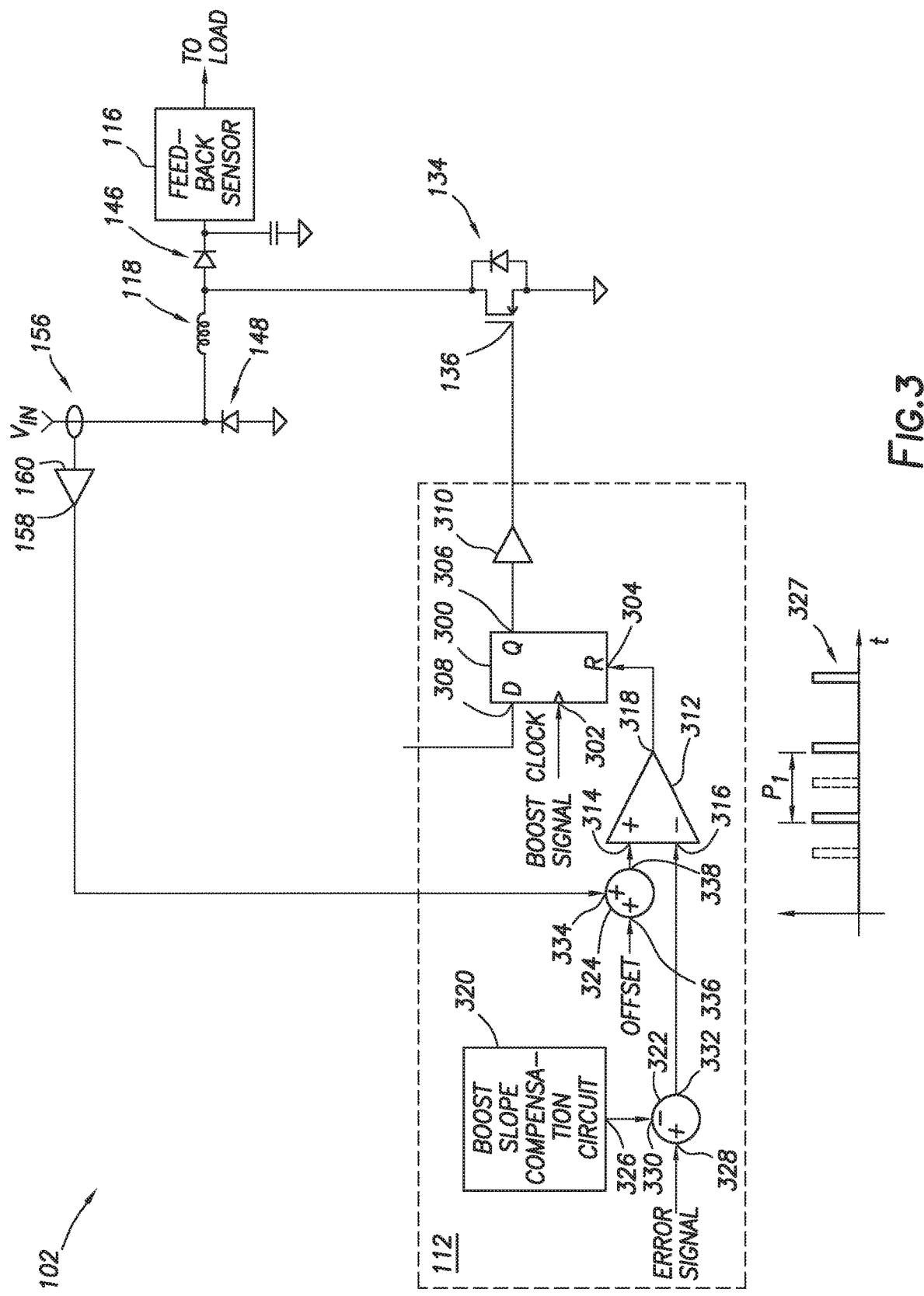
FIG. 3 shows a circuit diagram with respect to boost-only mode in accordance with at least some embodiments.

FIG. 3 shows a circuit diagram with respect to boost-only mode in accordance with at least some embodiments. In particular, FIG. 3 shows the boost circuit 112 coupled to the various electrical devices that create the output voltage $V_{OUT}$, such as the boost FET 134, inductor 118, diode 146, and diode 148. The example boost circuit 112 comprises a boost latch illustrative shown as a D flip-flop 300. The D flip-flop 300 defines a clock input 302, a reset input 304, and a latch or Q output 306, and a D input 308. The clock input 302 is coupled to the boost clock signal on the boost clock output 154 (FIG. 1). Consider for purposes of FIG. 3 that the D input 308 is coupled to a logic high signal. The Q output 306 is coupled to the gate 136 of the boost FET 134 by way of a gate driver circuit 310. As will be discussed more below, the D flip-flop 300 acts as a latch circuit, but other types of latch circuits may be used.

The example boost circuit 112 further includes a boost comparator 312 (e.g., an operational amplifier) defining a first input 314, a second input 316, and a compare output 318. The first input 314 is coupled to the current sense output 158 of the current sense transformer 156, the second input 316 is coupled to the error signal on the error output 168 (FIG. 1), and the compare output 318 is coupled to the reset input 304 of the D flip-flop 300. The description ignores for now the boost slope compensation circuit 320, the summing circuit 322, and the summing circuit 324.

FIG. 3 includes an embedded timing diagram 327 showing an example boost clock signal in solid lines. In particular, the example boost clock signal comprises a series of pulses. The time between corresponding features of contiguous pulses (e.g., rising edges) defines a switching cycle or switching period P1, which is the same switching period as the buck clock signal discussed above. Moreover, the timing diagram 327 shows the relationship of the boost clock signals to example buck clock signals shown in dashed lines. In some cases, the boost clock signal has the same frequency as the buck clock signal, but the boost clock signal has a different phase, such as an 180o phase offset from the buck clock signal as shown.

Assume initially that the Q output 306 is de-asserted, and that a pulse of the buck clock signal arrives at the clock input 302. By operation of the D flip-flop 300 the Q output 306 is asserted when the clock input 302 is asserted. Thus, the gate 136 of the boost FET 134 is asserted and the boost FET 134 becomes conductive. Current begins to flow from the input voltage VIN, through the buck FET 124 (conductive, thus omitted and shown merely as a short circuit), through the inductor 118 to ground through the boost FET 134, and the current is measured by the current sense transformer 156. The boost FET 134 is made nonconductive when the peak current through the inductor 118 is reached. In particular, the error signal applied to the second input 316 of the comparator 312 represents a peak current value. When the current signal applied to the first input 314 of the comparator 312 meets or exceeds the error signal on the second input 316, the comparator output 318 is asserted to the reset input 304 of the D flip-flop 300. When the reset input 304 is asserted, the Q output 306 is de-asserted, and thus the boost FET 134 is made nonconductive.

Because current through inductor 118 cannot change instantaneously, after the boost FET 134 is made nonconductive current flows through the inductor 118 and diode 146 to the load. The voltage produced downstream of the inductor 118 is thus the sum of the input voltage VIN and the voltage across the inductor 118, hence the boost operation. In the example system of FIG. 3, if the average current supplied to the load as measured by the feedback sensor 116 falls below a set point, the magnitude of error signal applied to the comparator 312 is increased, and thus the peak current in the next cycle is increased. Oppositely, if the average current supplied to the load is above the set point, the magnitude of error signal applied to the comparator 312 is decreased, and thus the peak current in the next cycle is decreased.

When operating a boost converter in peak current mode, certain duty cycles tend to induce subharmonic oscillations in the electrical components, For example, the inductor 118 may resonate with the parasitic capacitance of the boost FET 134, and may resonate with parasitic capacitances of other FETS not shown, such as the buck FET 124 (FIG. 1). In order to reduce or eliminate the subharmonic oscillations, the example boost circuit 112 implements the boost slope compensation circuit 320 and summing circuit 322. In particular, the boost slope compensation circuit 320 produces a time varying signal used to vary or dither the error signal applied to the boost comparator 312 such that peak current may be different as between contiguous switching cycles. The compensation signal produced by the boost slope compensation circuit 320 changes as a function of the difference between the input voltage VIN and output voltage $V_{OUT}$. An understanding of the precise features of the boost slope compensation signal is not needed for an understanding of boost mode operation, except to say that that boost slope compensation circuit 320 produces no boost compensation signal unless and until the overall buck-boost converter 102 is operating in boost-only mode.

The boost slope compensation circuit 320 defines a slope output 326. The summing circuit 322 defines a first input 328, a second input 330, and a sum output 332. The first input 328 couples to the error signal, the second input 330 couples to the slope compensation signal on the slope output 326, and the sum output 332 couples to the second input 316 of the boost comparator 312. The example summing circuit 322 is configured to subtract the instantaneous value of the slope compensation signal from the error signal (the subtraction indicated by the negative sign associated with the second input 330), and produce a modified error signal on the sum output 332. Thus, the peak current in any one cycle in boost-only mode is modified to reduce or eliminate the subharmonic oscillations.

In some example situations, the buck-boost converter 102 may operate in a boost-only mode. That is, when the input voltage VIN is sufficient low, the buck-boost converter 102 may operate in a mode where the boost FET opens and closes within each switching period, and the buck FET (not shown in FIG. 2) remains closed or conductive throughout each switching period. Thus, FIG. 3 can be considered to show a boost-only mode of operation.

Still referring to FIG. 3, and particularly the summing circuit 324 mentioned but not described above, the summing circuit 324 defines a first sum input 334, a second sum input 336, and a sum output 338. The first sum input 334 is coupled to the current sense signal on the current sense output 158. The second sum input 336 is coupled to an offset voltage. The sum output 338 is coupled to the first input 314 of the comparator 312. The summing circuit 324 is configured to add the offset voltage to the current sense signal to create a sum voltage (the addition indicated by the positive signs associated with the inputs), and drive the sum voltage to the sum output 338. As will be discussed in more detail below in relation to FIG. 4, the offset voltage applied to the second sum input 336 defines several ranges of values against which the error signal is compared to control whether the overall buck-boost converter 102 operates in a buck-only mode, a buck-boost mode, or a boost-only mode. Stated otherwise, the offset voltage sets a predetermined threshold in relation to the error signal where the boost circuit 112 begins to operate, alone or in combination with the buck circuit 110. Though not specifically shown so as not to unduly complicate the drawings, the second summing circuit 324 can be shifted to reside between the summing circuit 322 and the second input 316 of the comparator 312, with the summing circuit 324 configured to subtract the offset voltage from the modified error signal, and the overall effect would be the same.

Figure 4:
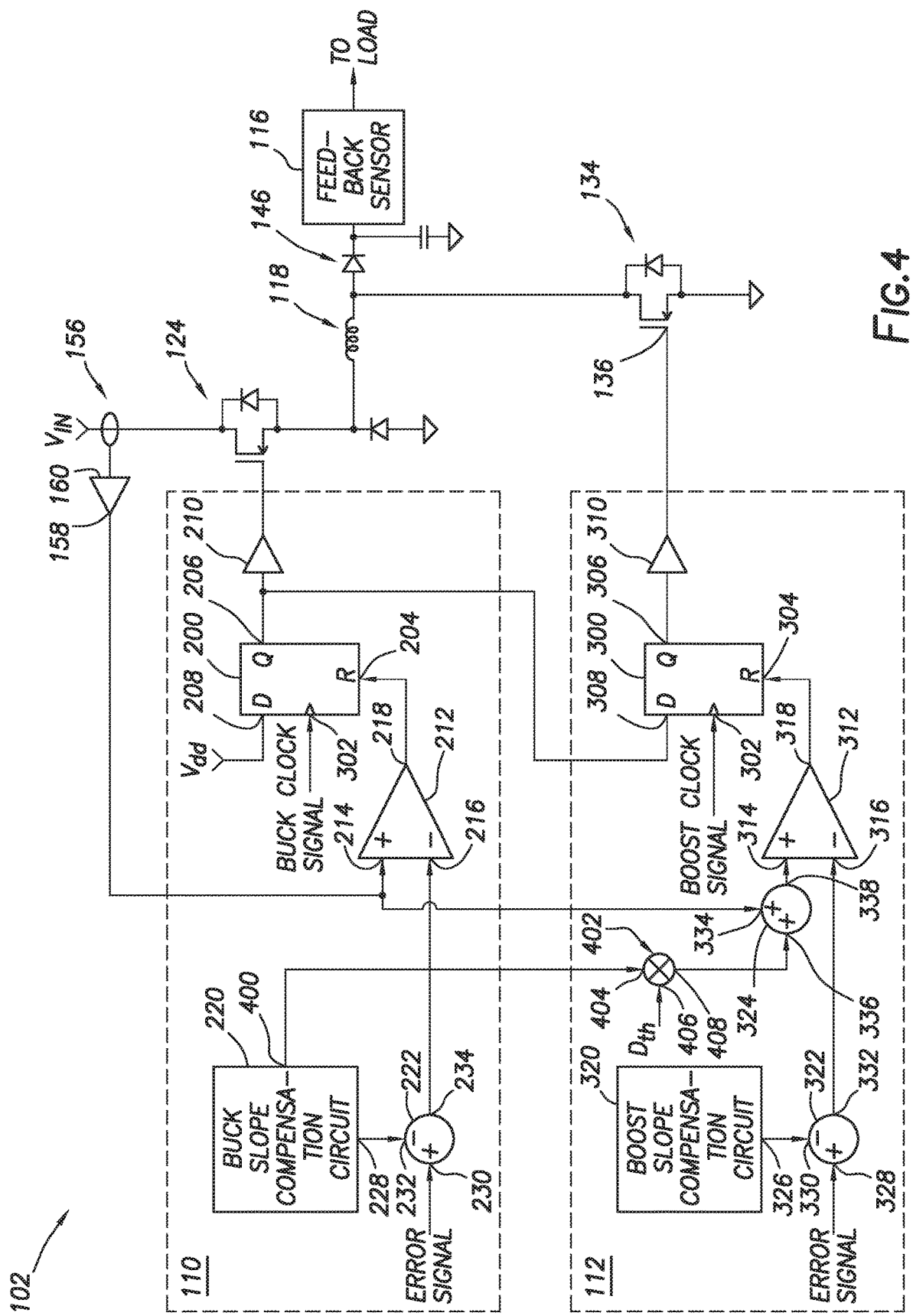
FIG. 4 shows a circuit diagram of the buck-boost converter in accordance with at least some embodiments.

FIG. 4 shows a circuit diagram of the buck-boost converter in accordance with at least some embodiments. In particular, FIG. 4 shows the buck circuit 110 and the boost circuit 112 coupled to the various electrical components, such as the buck FET 124, the inductor 118, the feedback sensor 116, and the boost FET 134. Also shown is the current sense transformer 156 coupled to the amplifier 160. The current sense signal on the current sense output 158 of the amplifier 160 couples to both the buck circuit 110 and boost circuit 112. Also as shown in FIG. 4, and for reasons that will be discussed more below, in the boost circuit 112 the D input 308 of the D flip-flop 300 couples to the Q output 206 of the D flip-flop 200 in the buck circuit 110.

The example buck slope compensation circuit 220 of FIG. 4 defines an additional output in the form of peak output 400. In the example system the buck slope compensation circuit 220 drives a voltage on the peak output 400 proportional to the peak magnitude VA of the slope compensation signal produced by the buck slope compensation circuit 220. The peak magnitude VA of the slope compensation signal may remain fixed for a fixed inductance and switching frequency, and thus the peak magnitude VA of the slope compensation signal may not vary for any particular buck-boost converter arrangement. It follows the voltage driven to the peak output 400 may be steady state DC value once established. However, inasmuch as the buck circuit 110 and boost circuit 112 may be co-packaged into a single driver integrated circuit (IC) and used with varying circuit components, the peak magnitude VA may vary as between buck-boost converters. In other cases, the voltage proportional to the peak magnitude VA of the slope compensation may be provided externally, such as by an external voltage divider circuit. The voltage proportional to the peak magnitude VA is provided to the boost circuit 112.

More particularly, the voltage proportional to the peak magnitude VA is coupled to a multiplier circuit 402. The multiplier circuit 402 defines a first input 404, a second input 406, and a multiply output 408. The multiplier circuit 402 is designed and constructed to mathematically multiply the magnitude voltage on the first input 404 by the magnitude of the voltage on the second input 406, and drive the resultant to the multiply output 408. In the example embodiment, the value applied to the second input 406 is referred to as a duty cycle threshold Dth. The multiplication of the duty cycle threshold Dth and the voltage proportional to the peak magnitude VA creates the offset voltage that sets the predetermined thresholds or voltage ranges against which the error signal is compared to control when the boost circuit 112 becomes operational. In the example system shown, when the error signal is below the sum of the offset voltage produced by multiplier circuit 402 and the current signal applied to the first input 314, the compare output 318 of the comparator 312 is asserted and thus the boost clock signal is masked. When the error signal is above the sum of the offset voltage and the current signal applied to the first input 314, the compare output 318 of the comparator 312 is de-asserted, the reset input 304 is de-asserted, and thus the boost clock signal is no longer masked. To the extent that the boost clock signal is asserted during periods of time that the reset input 304 is not asserted, then the gate 136 of the boost FET 134 is asserted and the boost FET 134 is made conductive until the peak current is reached.

Still referring to FIG. 4, having now described the buck-only mode in relation to FIG. 2, and the boost-only mode in relation to FIG. 3, the description now turns to transitioning of the circuit through the buck-boost mode. In particular, the description turns to an example movement from buck-only mode, then to buck-boost mode, then to boost-only mode. Consider first that the buck-boost converter 102 is running in the buck-only mode. As discussed with respect to FIG. 2, in example embodiments the buck-only mode operates at the switching frequency. Moreover, the buck-boost circuit 102 operates in the buck-only mode during periods of time when the error signal is within a first range of values. In the specific case where the buck-only mode operates when the error signal has a low magnitude, the offset voltage created by the multiplier circuit 402 within the boost circuit 112 creates a first predetermined threshold below which the error signal resides under the buck-only mode assumptions. Thus, the buck circuit 110 operates as discussed above, and the boost circuit 112 does not operate the boost FET 134 because the boost clock signal is masked by the reset input 304 of the D flip-flop 300 being held asserted.

Now consider that the input voltage VIN begins to drop, such as in the example automotive situation when the engine is being cranked. As the input voltage VIN drops, the average current through the inductor 118 likewise drops, and thus the error signal created by the feedback sensor 116 and the error amplifier 114 (FIG. 1) begins to increase. The example circuit thus changes to a buck-boost mode when the error signal is in a second range of values. More specifically, the example buck-boost converter 102 senses that the error signal has changed to be within the second range of values, and when the error signal is within the second range of values the boost clock signal is un-masked by de-assertion of the reset input 304 of the D flip-flop 300. In the specific case where the error signal has a low magnitude for buck-only mode, and a high magnitude for boost-only mode, the offset voltage created by the multiplier circuit 402 within the boost circuit 112 again creates the first predetermined threshold above which the error signal resides in the buck-boost mode. The boost circuit 112 thus begins to operate within each switching period, making the boost FET 134 conductive based on assertion of the boost clock signal assuming the buck FET 124 is conductive based on the connection of the D input 308 to the Q output 206, and then making the boost FET 134 non-conductive when the current through the inductor 118 meets or exceeds a current threshold.

In the buck-boost mode the example buck-boost converter 102 implements a pass through scheme for the current through the inductor 118 to lower the root-mean-square (RMS) inductor current. More specifically, in the buck-boost mode, during each switching period of the switching frequency, the converter first drives current through the inductor 118 by making only the buck FET 124 conductive, and then drives current through the inductor 118 by holding the buck FET 124 conductive and making a boost FET 134 conductive, and then drives current through the inductor 118 by making only the boost FET 134 conductive.

Now consider that the input voltage VIN continues to drop, such as in the example automotive situation when the engine is being cranked. As the input voltage VIN continues to drop, the average current through the inductor 118 likewise continues to drop, and thus the error signal created by the feedback sensor 116 and the error amplifier 114 (FIG. 1) further increases. The example circuit thus changes to a boost-only mode when the error signal is in a third range of values, and again the boost-only mode operating at the switching frequency. More specifically, the example buck-boost converter 102 senses that the error signal has changed to be within the third range of values, and when the error signal is within the third range of values several things happen. More specifically, the error signal goes high enough that the buck circuit 110 does not reach the peak current, and thus the buck FET 124 becomes conductive and stays conductive continuously in the boost only mode. As in the buck-boost mode, when the error signal is within the third range of values the boost clock signal is still un-masked. In the specific case where the error signal has a high magnitude for boost-only mode, the offset voltage created by the multiplier circuit 402 within the boost circuit 112 again creates the first predetermined threshold above which the error signal resides in the boost-only mode. Moreover, the transition to a boost-only mode takes place when the error signal rises above a second predetermined threshold such that the buck circuit 110 holds the buck FET 124 continuously conductive. The boost circuit 112 thus operates within each switching period, making the boost FET 134 conductive based on assertion of the boost clock signal, and then making the boost FET 134 non-conductive when the current through the inductor 118 meets or exceeds a current threshold.

Now consider that the input voltage VIN starts to rise again, such as in the example automotive situation when the engine cranking has stopped, the engine is running, and battery charging is taking place. As the magnitude of the error signal starts to fall (because average current is above the set point), the example buck-boost converter 102 may then change from the boost-only mode to the buck-boost mode. And as the magnitude of the error signal continues to fall because average current is above the set point, the example buck-boost converter 102 may then change from the buck-boost mode to the buck-only mode.

Figure 5:
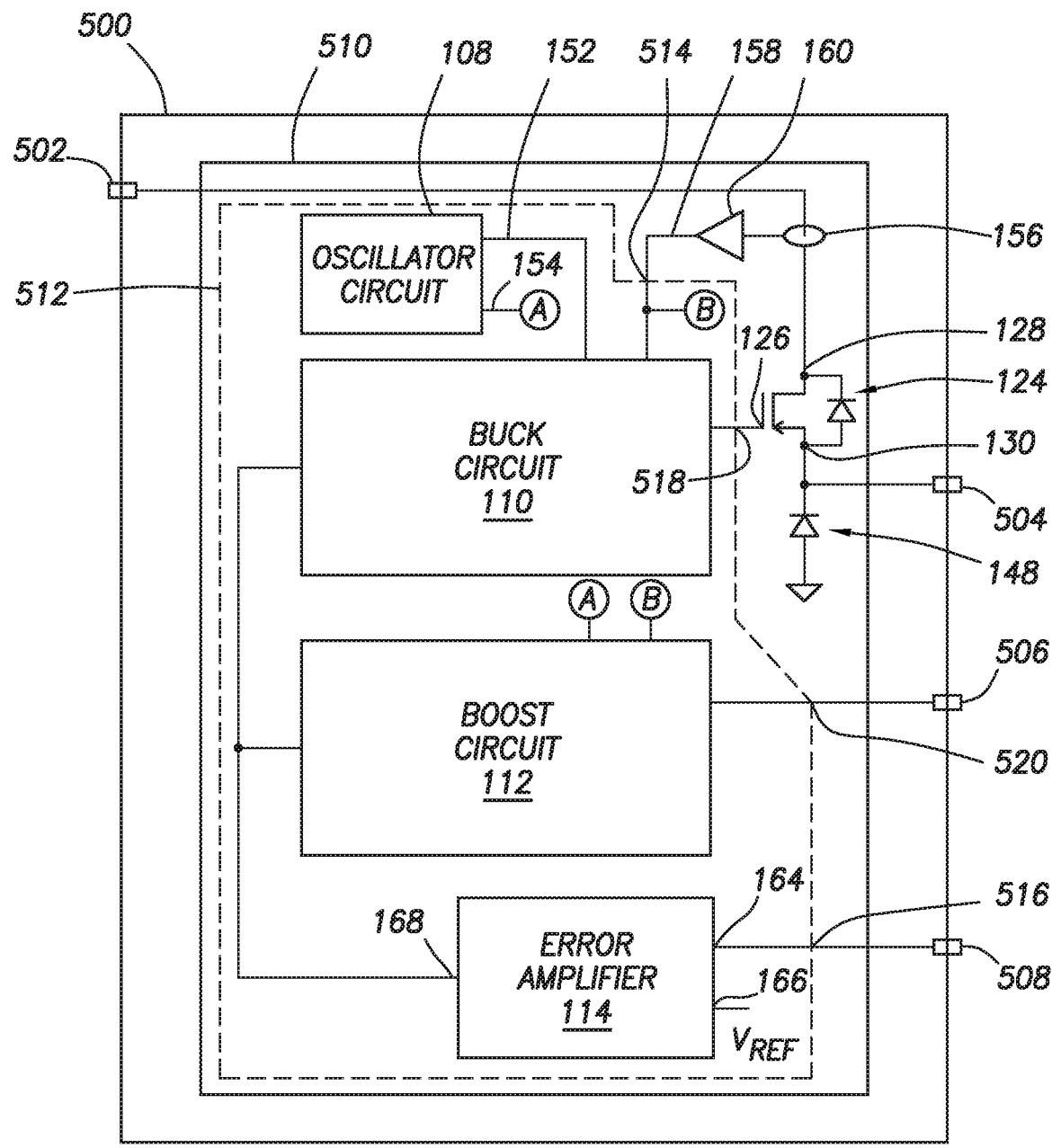
FIG. 5 shows a driver integrated circuit for a buck-boost converter in accordance with at least some embodiments.

FIG. 5 shows a driver IC for a buck-boost converter in accordance with at least some embodiments. In particular, driver IC 500 may be a packaged integrated circuit in any suitable package type, such as a dual in-line package or ball grid array. The driver IC 500 comprises a supply voltage terminal 502, a switch node terminal 504, a boost gate terminal 506, and a feedback terminal 508. Other terminals would likewise be present (e.g., ground terminal), but the additional terminals are not shown so as not to unduly complicate the figure. The supply voltage terminal 502 couples to the input voltage VIN. The switch node terminal 504 couples to the first lead 120 (FIG. 1) of the inductor 118 (FIG. 1) of a buck-boost converter 102 (FIG. 1). The boost gate terminal 506 couples to the gate 136 (FIG. 1) of the boost FET 134 (FIG. 1). The feedback terminal 508 couples to the feedback output 162 (FIG. 1) of the feedback sensor 116.

Internally the driver IC 500 comprises a control circuit 510 implemented on one or more semiconductor substrates. The example control circuit 510 comprises the buck FET 124 as well as the diode 148 as previously described. However, in other cases the buck FET and freewheeling diode may be externally supplied, and thus the switch node terminal 504 would become or be replaced with a buck gate terminal (i.e., a terminal that would electrically couple to the gate of an external buck FET). The control circuit 510 also comprises a current sensor defining the current sense output 158, as previously described.

The example driver IC 500, particularly the control circuit 510, further defines a controller 512. The example controller 512 defines a current sense input 514, a feedback sense input 516, a buck gate output 518, and a boost gate output 520. The current sense input 514 is coupled to the current sense signal on the current sense output 158. The feedback sense input 516 is coupled to the feedback terminal 508. The buck gate output 518 is coupled to the gate 126 of the buck FET 124. And the boost gate output 520 is coupled to the boost gate terminal 506. Operationally, the controller 512 comprises the oscillator circuit 108 as previously discussed, the error amplifier 114 as previously discussed, the buck circuit 110 as previously discussed, and the boost circuit 112 as previously discussed.

Figure 6:
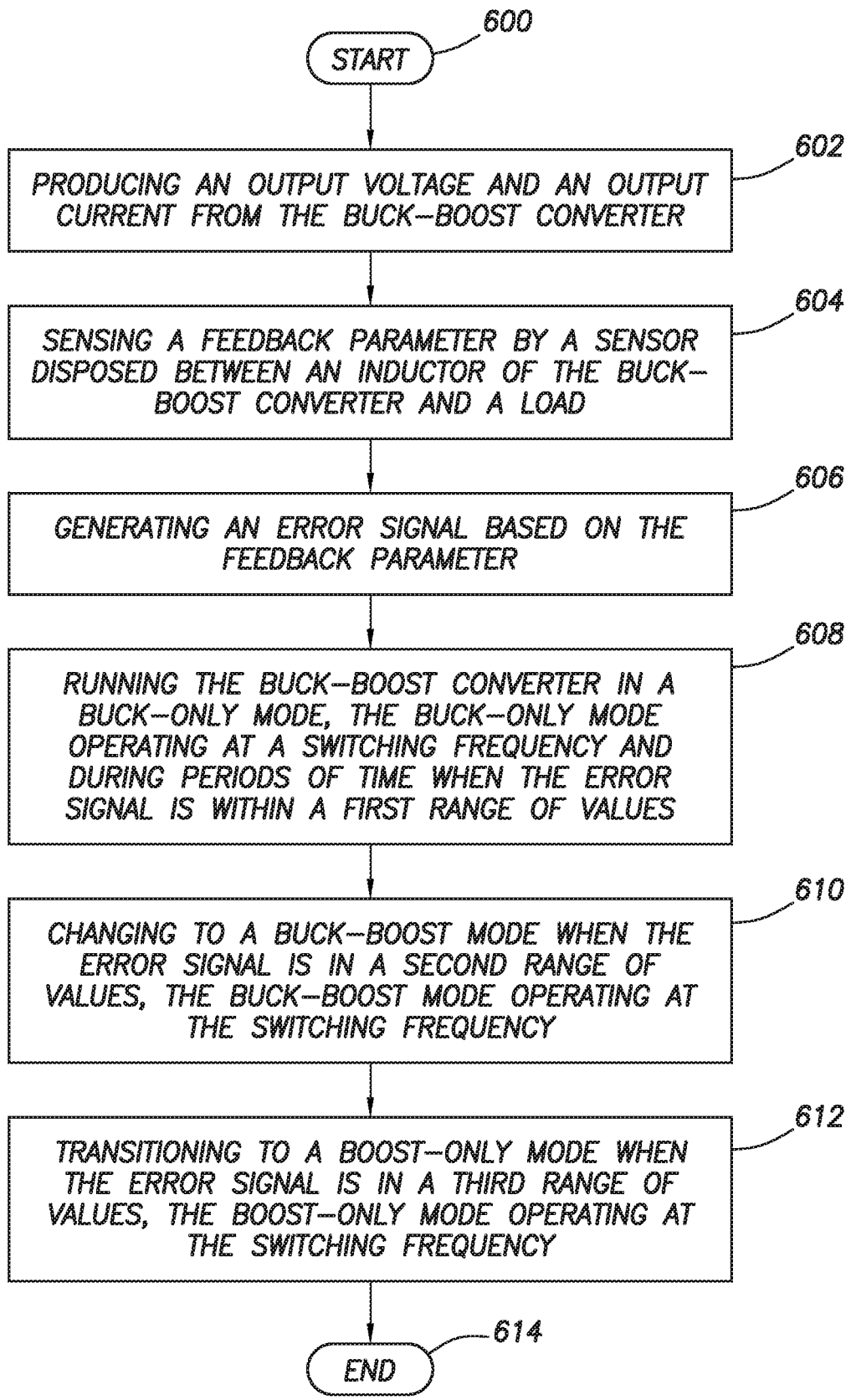
FIG. 6 shows a method in accordance with at least some embodiments.

FIG. 6 shows a method in accordance with at least some embodiments. In particular, the method starts (block 600) and comprises: producing an output voltage and an output current from the buck-boost converter (block 602); sensing a feedback parameter by a sensor disposed between an inductor of the buck-boost converter and a load (block 604); generating an error signal based on the feedback parameter (block 606); and then running the buck-boost converter in a buck-only mode, the buck-only mode operating at a switching frequency and during periods of time when the error signal is within a first range of values (block 608); changing to a buck-boost mode when the error signal is in a second range of values, the buck-boost mode operating at the switching frequency (block 610); transitioning to a boost-only mode when the error signal is in a third range of values, the boost-only mode operating at the switching frequency (block 612). Thereafter the method ends (block 614).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a buck-boost converter, comprising:
    producing an output voltage and an output current from the buck-boost converter;
    sensing a feedback parameter by a current sensor disposed between an inductor of the buck-boost converter and a load, the current sensor senses magnitude of current to the load;
    generating an error signal based on the feedback parameter;
    running the buck-boost converter in a buck-only mode, the buck-only mode operating at a switching frequency having a first phase during periods of time when the error signal is within a first range of values; and
    changing to a buck-boost mode when the error signal is in a second range of values, the buck-boost mode operating at the switching frequency; and
    transitioning to a boost-only mode when the error signal is in a third range of values, the boost-only mode operating at the switching frequency having a second phase difference than the first phase.

2. The method of claim 1 wherein running the buck-boost converter in the buck-only mode further comprises masking a boost clock signal when the error signal is within the first range of values.

3. The method of claim 2 wherein masking the boost clock signal further comprises asserting a reset input of a boost flip-flop when the error signal is within the first range of values.

4. The method of claim 1 wherein changing to the buck-boost mode further comprises:
    sensing that the error signal has changed to be within the second range of values; and
    asserting a reset input of a boost flip-flop when a charging current through the inductor of the buck-boost converter meets or exceeds a current threshold.

5. The method of claim 1 wherein during the buck-boost mode of the buck-boost converter the method further comprises, during each switching period of the switching frequency:
  driving current through the inductor by making a buck switch conductive while holding a boost switch non-conductive, the buck switch configured for buck operation and the boost switch configured for boost operation; and then
  driving current through the inductor by holding the buck switch conductive and making a boost switch conductive; and then
  driving current through the inductor by making the boost switch conductive while holding the buck switch non-conductive.

6. The method of claim 1 wherein transitioning to the boost-only mode further comprises:
  sensing that the error signal has changed to be within the third range of values; and
  refraining from asserting a reset input of a buck flip-flop based on the sensing.

7. The method of claim 1:
  wherein running the buck-boost converter in the buck-only mode further comprises running in the buck-only mode when the error signal is below a first predetermined threshold; and
  wherein changing to the buck-boost mode further comprises changing to the buck-boost mode when the error signal rises above the first predetermined threshold; and
  wherein transitioning to a boost-only mode further comprises transitioning when the error signal rises above a second predetermined threshold.

8. A power converter comprising:
  a buck field effect transistor (FET) defining a gate, a drain, and a source, the drain coupled to an input voltage;
  an inductor defining a first lead and a second lead, the first lead coupled to the source of the buck FET;
  a boost FET defining a gate, a drain, and a source, the drain of the boost FET coupled to the second lead of the inductor, and the source of the boost FET coupled to a ground;
  a feedback sensor defining a feedback output, the feedback sensor coupled between a voltage output of the power converter and the second lead of the inductor, the feedback sensor configured to sense a voltage or a current supplied by the power converter to a load;
  a current sensor defining a current sense output, the current sensor configured to sense current through the inductor and produce a current sense signal on the current sense output;
  a controller defining a current sense input, a feedback sense input, a buck gate output, and a boost gate output, the current sense input coupled to the current sense output, the feedback sense input coupled to the feedback output, the buck gate output coupled to the gate of the buck FET, and the boost gate output coupled to the gate of the boost FET;
  the controller comprising:
    an oscillator circuit configured to generate a buck clock signal at a switching frequency, and configured to generate a boost clock signal at the switching frequency, the boost clock signal having a phase difference from the buck clock signal;
    an error amplifier defining the feedback sense input and an error output, the feedback sense input coupled to the feedback output of the feedback sensor, the error amplifier configured to sense a feedback signal on the feedback sense input and produce an error signal on the error output, the error signal proportional to the feedback signal;
    a buck circuit, the buck circuit configured to assert the buck gate output based on assertion of the buck clock signal, and then de-assert the buck gate output if the current sense signal reaches a first peak current value; and
    a boost circuit, the boost circuit configured to assert the boost gate output based on assertion of the boost clock signal if the error signal is above a first predetermined threshold, and then de-assert the boost gate output when the current sense signal reaches a second peak current value.

9. The power converter of claim 8 wherein the buck circuit further comprises:
  a buck latch defining a clock input, a reset input, and a latch output, the clock input coupled to the buck clock signal, and the latch output coupled to the buck gate output; and
  a buck comparator defining a first input, a second input, and a compare output, the first input coupled to the current sense output of the current sensor, the second input coupled to the error signal, and the compare output coupled to the reset input of the buck latch;
  wherein the buck latch is configured to assert the buck gate output based on assertion of the buck clock signal, and de-assert the buck gate output if the reset input is asserted.

10. The power converter of claim 8 wherein the boost circuit further comprises:
  a boost latch defining a clock input, a reset input, and a latch output, the clock input of the boost latch coupled to the boost clock signal, and the latch output of the boost latch coupled to the boost gate output; and
  a boost comparator defining a first input, a second input, and a compare output, the second input of the boost comparator coupled to the error signal, and the compare output of the boost comparator coupled to the reset input of the boost latch;
  wherein the boost circuit is configured to assert the boost gate output based on assertion of the boost clock signal, and de-assert the boost gate output if the reset input of the boost latch is asserted.

11. The power converter of claim 10 wherein the boost circuit further comprises:
  a summing circuit defining a first sum input, a second sum input, and a sum output, the first sum input coupled to the current sense output, the second sum input coupled to an offset voltage, and the sum output coupled to the first input of the boost comparator;
  the summing circuit configured to add the offset voltage to the current sense signal to create a sum voltage, and drive the sum voltage to the sum output.

12. The power converter of claim 10 wherein the boost circuit further comprises:
  a summing circuit defining a first sum input, a second sum input, and a sum output, the first sum input coupled to the error signal, the second sum input coupled to an offset voltage, and the sum output coupled to the second input of the boost comparator;
  the summing circuit configured to subtract the offset voltage from the error signal to create a difference voltage, and drive the difference voltage to the sum output.

13. The power converter of claim 8:
wherein the buck circuit further comprises:
  a first D flip-flop defining a clock input, a reset input, a D input, and a Q output, the clock input coupled to the buck clock signal, the D input coupled to a power rail, and the Q output coupled to the buck gate output; and
  a buck comparator defining a first input, a second input, and a compare output, the first input coupled to the current sense output of the current sensor, the second input coupled to the error signal, and the compare output coupled to the reset input of the first D flip-flop;
wherein the boost circuit further comprises:
  a second D flip-flop defining a clock input, a reset input, a D input, and a Q output, the clock input of the second D flip-flop coupled to the boost clock signal, the D input of the second D flip-flop coupled to the Q output of the first D flip-flop, and the Q output of the second D flip-flop coupled to the boost gate output; and
  a boost comparator defining a first input, a second input, and a compare output, the second input of the boost comparator coupled to the error signal, and the compare output of the boost comparator coupled to the reset input of the second D flip-flop;
  a summing circuit defining a first sum input, a second sum input, and a sum output, the first sum input coupled to the current sense signal, the second sum input coupled to an offset voltage, and the sum output coupled to the first input of the boost comparator;
  the summing circuit configured to add the offset voltage to the current sense signal to create a sum voltage, and drive the sum voltage to the sum output.

14. A driver integrated circuit (IC) for a buck-boost converter, comprising:
  a supply voltage terminal, a switch node terminal, a boost gate terminal, and a feedback terminal;
  a buck field effect transistor (FET) defining a gate, a source, and a drain, the drain coupled to the supply voltage terminal, and the source coupled to the switch node terminal;
  a current sensor defining a current sense output, the current sensor associated with the buck FET, and the current sensor configured to generate a current sense signal proportional to current through the buck FET;
  a controller defining a current sense input, a feedback sense input, a buck gate output, and a boost gate output, the current sense input coupled to the current sense signal, the feedback sense input coupled to the feedback terminal, the buck gate output coupled to the gate of the buck FET, and the boost gate output coupled to the boost gate terminal;
  the controller comprising:
    an oscillator circuit configured to generate a buck clock signal at a switching frequency, and generate a boost clock signal at the switching frequency, the boost clock signal having a phase difference from the buck clock signal;
    an error amplifier defining the feedback sense input and an error output, the error amplifier configured to sense a feedback signal on the feedback terminal and produce an error signal on the error output, the error signal proportional to the feedback signal;
    a buck circuit, the buck circuit configured to assert the gate of the buck FET based on assertion of the buck clock signal, and then de-assert the gate of the buck FET if the current sense signal reaches a first peak current value; and
    a boost circuit, the boost circuit configured to assert the boost gate terminal based on assertion of the boost clock signal if the error signal is above a first predetermined threshold, and then de-assert the boost gate terminal when the current sense signal reaches a second peak current value.

15. The driver IC of claim 14 wherein the buck circuit further comprises:
  a buck latch defining a clock input, a reset input, and a latch output, the clock input coupled to the buck clock signal, and the latch output coupled to the gate of the buck FET; and
  a buck comparator defining a first input, a second input, and a compare output, the first input coupled to the current sense output of the current sensor, the second input coupled to the error output of the error amplifier, and the compare output coupled to the reset input of the buck latch;
wherein the buck latch is configured to assert the gate of the buck FET on assertion of the buck clock signal, and de-assert the gate of the buck FET if the reset input is asserted.

16. The driver IC of claim 14 wherein the boost circuit further comprises:
  a boost latch defining a clock input, a reset input, and a latch output, the clock input of the boost latch coupled to the boost clock signal, and the latch output of the boost latch coupled to the boost gate terminal; and
  a boost comparator defining a first input, a second input, and a compare output, the second input of the boost comparator coupled to the error output of the error amplifier, and the compare output of the boost comparator coupled to the reset input of the boost latch;
wherein the boost circuit is configured to assert the boost gate terminal based on assertion of the boost clock signal, and de-assert the boost gate terminal if the reset input of the boost latch is asserted.

17. The driver IC of claim 16 wherein the boost circuit further comprises:
  a summing circuit defining a first sum input, a second sum input, and a sum output, the first sum input coupled to the current sense output of the current sensor, the second sum input coupled to an offset voltage, and the sum output coupled to the first input of the boost comparator;
  the summing circuit configured to add the offset voltage to the current sense signal to create a sum voltage, and drive the sum voltage to the sum output.

18. The driver IC of claim 16 wherein the boost circuit further comprises:
  a summing circuit defining a first sum input, a second sum input, and a sum output, the first sum input coupled to the error output of the error amplifier, the second sum input coupled to an offset voltage, and the sum output coupled to the second input of the boost comparator;
  the summing circuit configured to subtract the offset voltage from the error signal to create a difference voltage, and drive the difference voltage to the sum output.

19. The driver IC of claim 14:
wherein the buck circuit further comprises:
  a first D flip-flop defining a clock input, a reset input, a D input, and a Q output, the clock input coupled to the buck clock signal, the D input coupled to a power rail, and the Q output coupled to the gate of the buck FET; and a buck comparator defining a first input, a second input, and a compare output, the first input coupled to the current sense output of the current sensor, the second input coupled to the error output of the error amplifier, and the compare output coupled to the reset input of the first D flip-flop;

wherein the boost circuit further comprises:

a second D flip-flop defining a clock input, a reset input, a D input, and a Q output, the clock input of the second D flip-flop coupled to the boost clock signal, the D input of the second D flip-flop coupled to the Q output of the first D flip-flop, and the Q output of the second D flip-flop coupled to the boost gate terminal;

a boost comparator defining a first input, a second input, and a compare output, the second input of the boost comparator coupled to the error output of the error amplifier, and the compare output of the boost comparator coupled to the reset input of the second D flip-flop;

a summing circuit defining a first sum input, a second sum input, and a sum output, the first sum input coupled to the current sense output of the current sensor, the second sum input coupled to an offset voltage, and the sum output coupled to the first input of the boost comparator;

the summing circuit configured to add the offset voltage to the current sense signal to create a sum voltage, and drive the sum voltage to the sum output.

20. The driver IC of claim 14:

wherein the buck circuit further comprises:

a first D flip-flop defining a clock input, a reset input, a D input, and a Q output, the clock input coupled to the buck clock signal, the D input coupled to a power rail, and the Q output coupled to the gate of the buck FET; and a buck comparator defining a first input, a second input, and a compare output, the first input coupled to the current sense output of the current sensor, the second input coupled to the error output of the error amplifier, and the compare output coupled to the reset input of the first D flip-flop;

wherein the boost circuit further comprises:

a second D flip-flop defining a clock input, a reset input, a D input, and a Q output, the clock input of the second D flip-flop coupled to the boost clock signal, the D input of the second D flip-flop coupled to the Q output of the first D flip-flop, and the Q output of the second D flip-flop coupled to the boost gate terminal;

a boost comparator defining a first input, a second input, and a compare output, the second input of the boost comparator coupled to the error output of the error amplifier, and the compare output of the boost comparator coupled to the reset input of the second D flip-flop;

a summing circuit defining a first sum input, a second sum input, and a sum output, the first sum input coupled to the current sense output of the current sensor, the second sum input coupled to an offset voltage, and the sum output coupled to the second input of the boost comparator;

the summing circuit configured to subtract the offset voltage from the error output to create a difference voltage, and drive the difference voltage to the sum output.

* * * * *

UNITED STATES PATENT AND TRADEMARK OFFICE
CERTIFICATE OF CORRECTION

Page 1 of 1

PATENT NO. : 10,566,902 B1
APPLICATION NO. : 16/109016
DATED : February 18, 2020
INVENTOR(S) : Dominique Romeo It is certified that error appears in the above-identified patent and that said Letters Patent is hereby corrected as shown below:

In the Claims

Column 12,
Claim 1, Line 52, "difference" should be --different--

Signed and Sealed this
Fifth Day of May, 2020

Andrei Iancu
*Director of the United States Patent and Trademark Office*